United States Patent
Oba et al.

(10) Patent No.: US 6,995,106 B2
(45) Date of Patent: Feb. 7, 2006

(54) DIELECTRIC CERAMIC MATERIAL

(75) Inventors: Takashi Oba, Mie (JP); Masahiko Matsumiya, Aichi (JP); Akifumi Tosa, Aichi (JP); Kazuhisa Itakura, Komaki (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 10/194,941

(22) Filed: Jul. 15, 2002

(65) Prior Publication Data

US 2003/0109374 A1 Jun. 12, 2003

(30) Foreign Application Priority Data

Jul. 16, 2001 (JP) ........................................ 2001-215941
Oct. 26, 2001 (JP) ........................................ 2001-329618

(51) Int. Cl.
*C04B 35/495* (2006.01)

(52) U.S. Cl. ..................................................... 501/135
(58) Field of Classification Search .................. 501/135
See application file for complete search history.

(56) References Cited

U.S. PATENT DOCUMENTS 6,117,806 A * 9/2000 Yokoi et al. ................. 501/135
6,569,796 B2 * 5/2003 Itakura et al. ............... 501/135

FOREIGN PATENT DOCUMENTS

| EP | 0 838 446 A1 | 4/1998 |
|---|---|---|
| EP | 1 020 416 A2 | 7/2000 |
| EP | 1 205 453 A1 | 5/2002 |
| JP | 2-53884 | 11/1990 |
| JP | 4-321 | 1/1992 |
| JP | 9-169567 | 6/1997 |
| JP | 9-227230 | 9/1997 |
| JP | 9-315863 | 12/1997 |
| JP | 10-45471 | 2/1998 |
| JP | 2000-203934 | 7/2000 |
| JP | 2001-141568 | 6/2001 |

* cited by examiner

*Primary Examiner*—Karl Group
(74) *Attorney, Agent, or Firm*—Stites & Harbison; Ross F. Hunt, Jr.

(57) ABSTRACT

A dielectric ceramic material is represented by the following compositional formula, $(100-a)[Ba_u\{(Zn_vCo_{1-v})_wNb_x\}O_{\delta 1}]-a[M_yTa_zO_{\delta 2}]$, where M represents at least one species selected from K, Na, and Li. In one method, the dielectric material is produced by mixing raw material powders such that proportions by mol of component metals simultaneously satisfy the relations, $0.5 \leq a \leq 25$; $0.98 \leq u \leq 1.03$; $0 \leq v \leq 1$; $0.274 \leq w \leq 0.374$; $0.646 \leq x \leq 0.696$; $0.5 \leq y \leq 2.5$; and $0.8 \leq z \leq 1.2$. The method further includes subjecting the resultant mixture to primary pulverization; calcining the resultant powder at 1,100–1,300° C., followed by wet secondary pulverization; drying the resultant paste; granulating; molding the resultant granules to thereby yield a compact; and firing the compact in air advantageously at 1,400–1,600° C.

18 Claims, 9 Drawing Sheets

DIELECTRIC CERAMIC MATERIAL

FIELD OF THE INVENTION

The present invention relates to a dielectric ceramic material and, more particularly, to a dielectric ceramic material exhibiting improved characteristics including a small dielectric loss and a small absolute value of temperature coefficient of resonance frequency.

BACKGROUND OF THE INVENTION

Conventionally, a variety of compositions of dielectric ceramic materials have been investigated in order to adapt the ceramic materials to use in a high-frequency region such as the microwave region or the milliwave region, where dielectric characteristics such as a large relative dielectric constant, a small dielectric loss, and a small absolute value of temperature coefficient of resonance frequency are required. In relation to such dielectric ceramic materials, Japanese Patent Publication (kokoku) Nos. 2-53884 and 4-321 and other publications disclose dielectric ceramic materials having a $BaNbO_3$ component. The Ba(Zn, Nb) dielectric materials disclosed in the above publications exhibit excellent characteristics; i.e., a high unloaded quality coefficient and a small temperature coefficient of resonance frequency.

However, the aforementioned Ba(Zn, Nb) dielectric materials do not necessarily exhibit a satisfactory percent maintenance of unloaded quality coefficient as expressed by percentage of unloaded quality coefficient measured at high temperature (approximately 125° C.) with respect to that measured at room temperature (approximately 25° C.). Therefore, when these dielectric ceramic materials are used in dielectric resonators and other apparatus, dielectric loss at high frequency problematically increases. In order to overcome this problem, researchers have pursued development of dielectric ceramic materials which exhibit improved dielectric characteristics and a small temperature dependency on resonance frequency and which maintain a high percent maintenance of Q value as expressed as a percentage of Q value measured at high temperature with respect to that measured at room temperature.

SUMMARY OF THE INVENTION

The present invention is basically concerned with overcoming the aforementioned drawbacks of the prior art. Thus, an object of the present invention is to provide a dielectric ceramic material which can attain a large unloaded quality coefficient and a small absolute value of temperature coefficient of resonance frequency as compared with conventional dielectric ceramic materials containing a $BaNbO_3$ component and which allows selection of dielectric characteristics over a wide range.

Another object of the invention is to provide a dielectric ceramic material which enables provision of improved dielectric characteristics through firing at a lower temperature.

Still another object of the invention is to provide a dielectric ceramic material which can maintain a high percent maintenance Q value as expressed as a percentage of Q value measured at high temperature with respect to that measured at room temperature.

The present invention concerns a dielectric ceramic material comprising Ba, Nb, and Ta; at least one of Zn and Co; and at least one species selected from the group consisting of K, Na, and Li, the ceramic material being represented by the compositional formula: $(100-a)[Ba_u\{(Zn_vCo_{1-v})_wNb_x\}O_{\delta 1}]-a[M_yTa_2O_{\delta 2}]$ where M represents at least one species selected from the group consisting of K, Na, and Li, and the following relations are satisfied simultaneously: $0.5 \leq a \leq 25$; $0.98 \leq u \leq 1.03$; $0 \leq v \leq 1$; $0.274 \leq w \leq 0.374$; $0.646 \leq x \leq 0.696$; $0.5 \leq y \leq 2.5$; and $0.8 \leq z \leq 1.2$.

The present invention also concerns a dielectric ceramic material represented by the compositional formula, $(100-a)[Ba_u\{(Zn_vCo_{1-v})_wNb_x\}O_{\delta 1}]-a[M_yTa_2O_{\delta 2}]$, where M represents at least one species selected from the group consisting of K, Na, and L. The ceramic material is produced by mixing raw material powders such that proportions by mol of component metals simultaneously satisfy the relations: $0.5 \leq a \leq 25$; $0.98 \leq u \leq 1.03$; $0 \leq v \leq 1$; $0.274 \leq w \leq 0.374$; $0.646 \leq x \leq 0.696$; $0.5 \leq y \leq 2.5$; and $0.8 \leq z \leq 1.2$. The resultant mixture powder is molded to thereby yield a compact and the compact is fired.

The present invention also concerns a dielectric ceramic material comprising Ba, Nb, and Ta; at least one of Zn and Co; at least one species selected from the group consisting of K, Na, and Li; and Mn or W, where Mn and W are contained in amounts of 0.02–3 mass % as reduced to $MnO_2$ and 0.02–4.5 mass % as reduced to $WO_3$, respectively, on the basis of 100 parts by mass of the composition: $(100-a)[Ba_u\{(Zn_vCo_{1-v})_wNb_x\}O_{\delta 1}]-a[M_yTa_2O_{\delta 2}]$, where M represents at least one species selected from the group consisting of K, Na, and Li, and the relations: $0.5 \leq a \leq 25$; $0.98 \leq u \leq 1.03$; $0 \leq v \leq 1$; $0.274 \leq w \leq 0.374$; $0.646 \leq x \leq 0.696$; $0.5 \leq y \leq 2.5$; and $0.8 \leq z \leq 1.2$ are satisfied simultaneously.

The present invention also concerns a method for manufacturing a dielectric ceramic material which includes mixing raw material powders which will comprise the dielectric ceramic material represented by the compositional formula: $(100-a)[Ba_u\{(Zn_vCo_{1-v})_wNb_x\}O_{\delta 1}]-a[M_yTa_2O_{\delta 2}]$, where M represents at least one species selected from the group consisting of K, Na, and Li, such that proportions by mol of component metals simultaneously satisfy the relations: $0.5 \leq a \leq 25$; $0.98 \leq u \leq 1.03$; $0 \leq v \leq 1$; $0.274 \leq w \leq 0.374$; $0.646 \leq x \leq 0.696$; $0.5 \leq y \leq 2.5$; and $0.8 \leq z \leq 1.2$. The resultant mixture powder is molded to thereby yield a compact and the compact is fired.

Further features and advantages of the present invention will be set forth in, or apparent from, the detailed description of preferred embodiments thereof which follows.

BRIEF DESCRIPTION OF THE DRAWINGS

FIG. 12 is a chart of X-ray diffraction measurement of dielectric ceramic materials with increasing a;

DETAILED DESCRIPTION OF THE INVENTION

Figure 1:
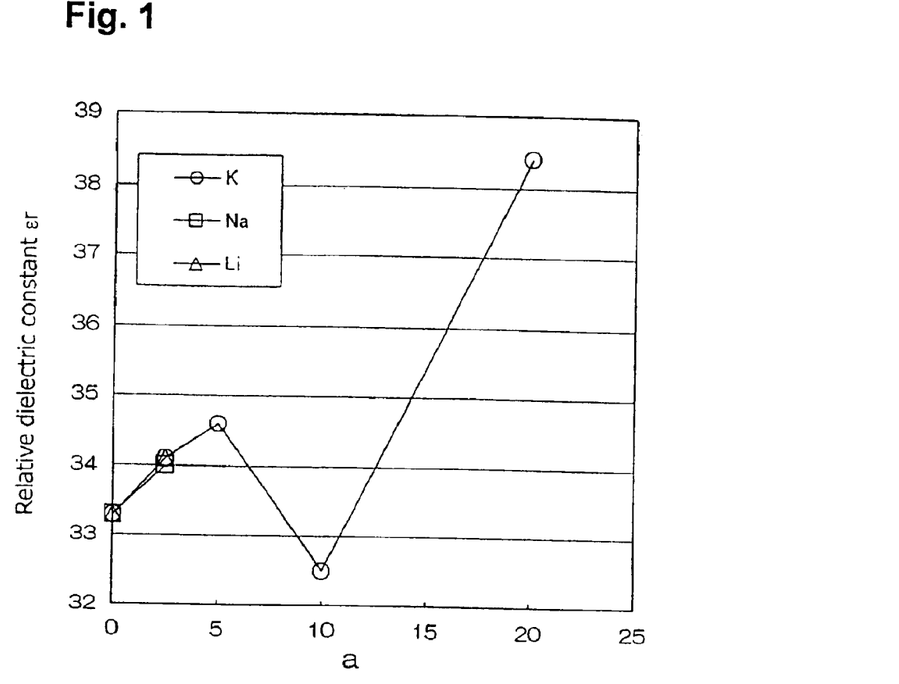
FIG. 1 is a graph showing correlation between a and $\epsilon r$.
Figure 2:
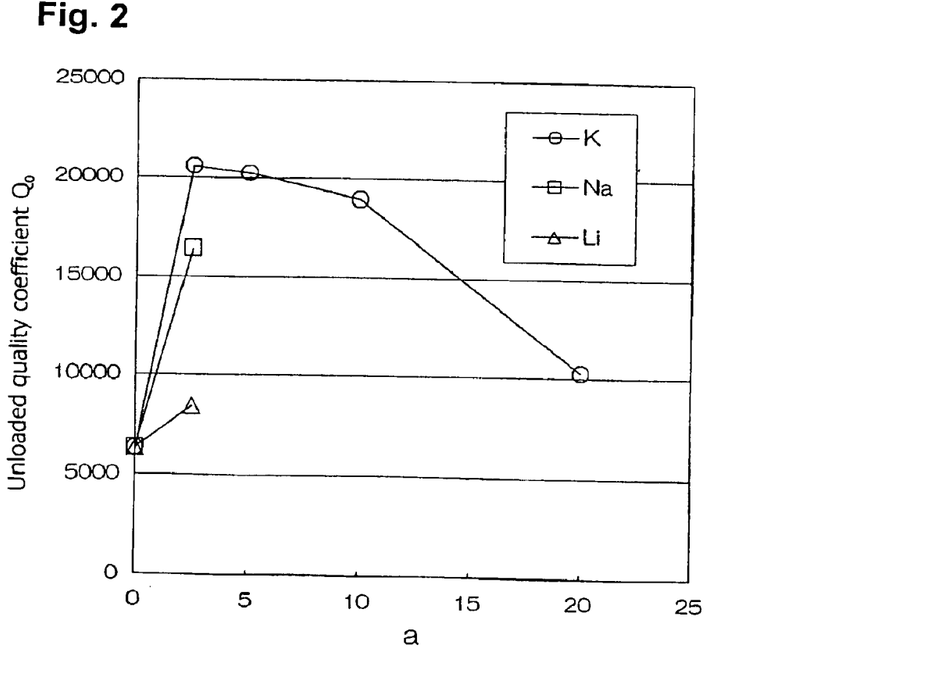
FIG. 2 is a graph showing correlation between a and $Q_0$.
Figure 3:
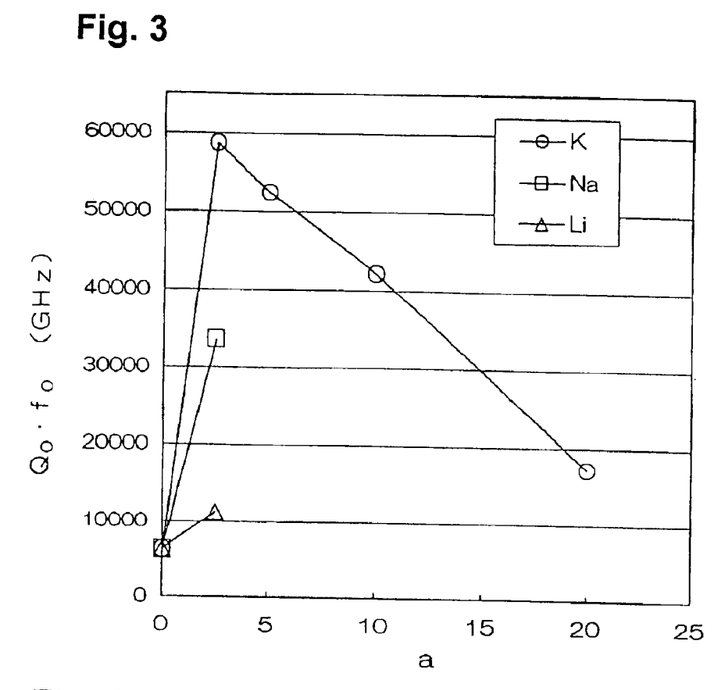
FIG. 3 is a graph showing correlation between a and $Q_0 \cdot f_0$.

The incorporation of M and Ta into a ceramic material allows one to obtain a dielectric ceramic material exhibiting a large unloaded quality coefficient (which hereinafter may be referred to simply as "$Q_0$") as compared with a dielectric ceramic material containing no M or Ta. In such a case, even though the amounts of M or Ta added are small, a remarkably large $Q_0$ of the dielectric ceramic material containing M and Ta can be provided as compared with a dielectric ceramic material containing no M or Ta (see FIGS. 2 and 3). Moreover, the resultant ceramic material shows quite unexpected behavior; the $Q_0$ shows its peak (maximum) in the vicinity of a=2.5. This effect is significantly remarkable when M is K or Na, and most remarkable when M is K.

Figure 4:
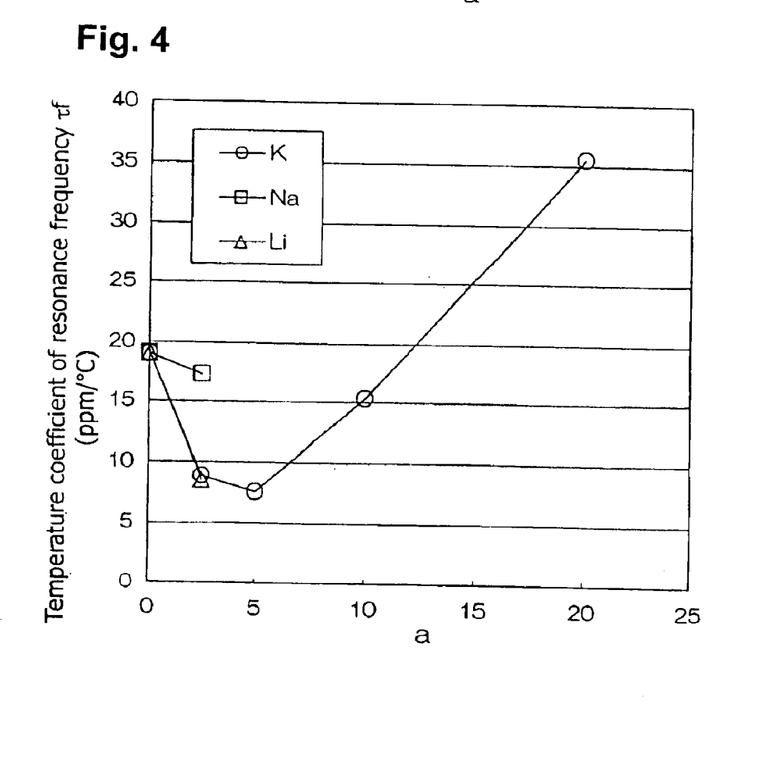
FIG. 4 is a graph showing correlation between a and $\tau f$.

Through incorporation of M and Ta into the ceramic material, a dielectric ceramic material exhibiting a small absolute value of temperature coefficient of resonance frequency (hereinafter may be referred to simply as "$\tau f$") can be produced. In such a case, even though the amounts of M and Ta added are small, a remarkably small absolute value of $\tau f$ of the dielectric ceramic material containing M and Ta can be obtained as compared with a dielectric ceramic material containing no M or Ta (see FIG. 4). Moreover, the resultant ceramic material shows quite unexpected behavior; the $\tau f$ shows its peak (minimum) approximately at a=5. This effect is particularly remarkable when M is K or Li.

Through incorporation of M and Ta into the ceramic material, the firing temperature during production of the dielectric ceramic material of the present invention can also be lowered. Particularly when M is K, a dielectric ceramic material exhibiting well-balanced dielectric characteristics; i.e., a large relative dielectric constant (hereinafter may be referred to simply as "$\epsilon r$"), a large $Q_0$, and a small absolute value of $\tau f$ can be produced through firing at a low firing temperature (see FIGS. 5 to 8).

The value of "a," representing (M+Ta) content, satisfies the relation $0.5 \leq a \leq 25$. When a is less than 0.5, the aforementioned effects commensurate with incorporation of M and Ta may be difficult to attain, whereas when a is in excess of 25, the ceramic material compact cannot maintain its shape during firing, possibly resulting in difficulty in production of dielectric ceramics. Although no particular limitation is imposed on the value of a so long as a falls within the above range, the range is preferably $1 \leq a \leq 20$, more preferably $1 \leq a \leq 10$, most preferably $2 \leq a \leq 8$, from the viewpoint of the aforementioned effects.

The value of "y" satisfies the relation $0.5 \leq y \leq 2.5$ (preferably $1.0 \leq y \leq 2.0$). When y is less than 0.5, sufficient sintering tends to be difficult. When y is less than 0.5 or in excess of 2.5, the product of unloaded quality coefficient and resonance frequency (hereinafter may be referred to simply as "$Q_0 \cdot f_0$") may be problematically insufficient.

The value of "z" satisfies the relation $0.8 \leq z \leq 1.2$. When z falls within $0.9 \leq z \leq 1.1$, $Q_0 \cdot f_0$ attains a particularly large value, which is preferable. In contrast, when z is less than 0.8 or in excess of 1.2, a sufficiently large $Q_0 \cdot f_0$ value may fail to be attained, which is disadvantageous.

The dielectric ceramic material of the composition contains at least one of Zn and Co. The absolute value of $Q_0$ and that of $\tau f$ can be controlled over a wide range through modification of the Zn content or the Co content. Particularly, increase in Zn content remarkably elevates $Q_0$ (see FIG. 10). However, $Q_0$ exhibits its peak value at a certain Zn content (or Co content) when the Zn content is varied. This unexpected feature is different from the behavior of $\epsilon r$ (absolute value) and that of $\tau f$ (see FIGS. 9 and 11). In addition to elevating $Q_0$, increase in Zn content can elevate $\epsilon r$ (see FIG. 9) and reduce the absolute value of $\tau f$ (see FIG. 11).

The value of "v," representing Zn content, can be modified within a range of $0 \leq v \leq 1$. Although no particular limitation is imposed on v, a preferred range is $0.3 \leq v \leq 1$, in that all dielectric characteristics can be enhanced. A range of $0.4 \leq v \leq 0.8$ is more preferred, in that $Q_0$ can be maintained at a high level. A range of $0.4 \leq v \leq 0.75$ is particularly preferred, in that well-balanced dielectric properties; i.e., a large $Q_0$ and a small absolute value of $\tau f$, can be attained. Needless to say, the aforementioned "1-v," representing Co content, can also be modified within a range of $0 \leq 1-v \leq 1$.

The value of "u" satisfies the relation $0.98 \leq u \leq 1.03$, preferably $0.99 \leq u \leq 1.02$. When u is less than 0.98 or in excess of 1.03, a sufficiently large $Q_0 \cdot f_0$ value may fail to be attained, which is disadvantageous. When u is in excess of 1.03, satisfactory sintering tends to be difficult to attain.

The value of "w" satisfies the relation $0.274 \leq w \leq 0.374$, preferably $0.294 \leq w \leq 0.354$. When w is less than 0.274 or in excess of 0.374, a sufficiently large $Q_0 \cdot f_0$ value may fail to be attained, which is disadvantageous.

The value of "x" satisfies the relation $0.646 \leq x \leq 0.696$, preferably $0.656 \leq w \leq 0.686$. When x is less than 0.646 or in excess of 0.696, a sufficiently large $Q_0 \cdot f_0$ value may fail to be attained, which is disadvantageous.

The value of "$\delta 1$" or "$\delta 2$" generally equals to an equivalent value with respect to the metal species contained. However, the value is not particularly fixed to the equivalent value so long as the desired dielectric characteristics are not impaired. For example, $\delta 1$ falls within a range of $2.9 \leq \delta 1 \leq 3.1$, and $\delta 2$ falls within a range of $2.5 \leq \delta 2 \leq 4$.

The compositional formula of the dielectric ceramic material is represented by two terms; i.e., $[Ba_u\{(Zn_vCo_{1-v})_w Nb_x\}O_{\delta 1}]$(hereinafter referred to simply as "BZCN component") and $[M_yTa_zO_{\delta 2}]$ (hereinafter referred to simply as "MT component"). However, in the dielectric ceramic material, the BZCN component and the MT component form a solid solution having a single composition. Formation of the solid solution is confirmed by failure to observe an intrinsic diffraction peak (31.69°) attributed to the MT component in an X-ray diffraction chart (see FIG. 13); diffraction peaks of a dielectric ceramic material containing the MT component shifting on the higher angle side as compared with diffraction peaks of a BZCN dielectric ceramic material (see FIG. 13); and observation of approximately proportional correlation between the MT component content (a) and d values (see FIG. 14).

Therefore, according to the present invention, there can be obtained a large $Q_0$ and a small absolute value of $\tau f$, which have not been satisfactorily attained by a dielectric ceramic material formed solely of a BZCN component, and well-balanced dielectric characteristics including these two properties can be provided.

In addition to containing these components, the dielectric ceramic material of the present composition may further contain Mn or W. The Mn content or W content is such that, with respect to 100 parts by mass of the following composition: $(100-a)[Ba_u\{(Zn_vCo_{1-v})_wNb_x\}O_{\delta1}]-a[M_yTa_zO_{\delta2}]$, (where M represents at least one species selected from the group consisting of Li, Na, and K, and the following relations are satisfied simultaneously: $0.5 \leq a \leq 25$; $0.98 \leq u \leq 1.03$; $0 \leq v \leq 1$; $0.274 \leq w \leq 0.374$; $0.646 \leq x \leq 0.696$; $0.5 \leq y \leq 2.5$; and $0.8 \leq z \leq 1.2$), Mn is present in an amount of 0.02–3 mass % as reduced to $MnO_2$, preferably 0.02–2.5 mass %, more preferably 0.02–2 mass %, particularly preferably 0.02–1.5 mass %, most preferably 0.05–1.5 mass %, or W is present in an amount of 0.02–4.5 mass % as reduced to $WO_3$, preferably 0.02–4 mass %, more preferably 0.02–3.5 mass %, particularly preferably 0.02–3 mass %, most preferably 0.03–2 mass %. Controlling of the aforementioned Mn content or W content (oxide-based) to 0.02 mass % or higher is preferred, since deterioration of percent maintenance of Q value at high temperature can be prevented, and a higher Q value can be maintained. Controlling of the aforementioned Mn content (oxide-based) to 3 mass % or less or the W content (oxide-based) to 4.5 mass % or lower is preferred, since deterioration of percent maintenance of Q value at room temperature and high temperature can be prevented, the absolute value of τf can be reduced, and more excellent dielectric characteristics can be maintained.

The aforementioned Mn or W is incorporated typically in oxide form such as $MnO_2$ or $WO_3$ and resides in the dielectric ceramic material. However, the form is not limited to oxide, and other forms such as salts, halides, and alkoxides may be employed so long as Mn or W can be incorporated into the dielectric ceramic material.

According to the present invention, when a preferred compositional range and preferred firing temperature are employed, the following characteristics can be attained: εr of 32–37 (preferably 32–36, more preferably 33–35); $Q_0$ as measured in $TE_{011}$, mode of 7,000–23,000 (preferably 9,000–22,000, more preferably 10,000–21,000); $Q_0 \cdot f_0$ as measured in $TE_{01\delta}$ mode of 7,000–63,000 GHz (preferably 10,000–60,000 GHz, more preferably 20,000–60,000 GHz); and temperature coefficient of resonance frequency (τf) of −12 to 34 ppm/° C. (preferably −5 to 32 ppm/° C., more preferably −2 to 15 ppm/° C).

When M is K and a is 1–10, the following characteristics can be attained: εr of 32–37 (preferably 32–36, more preferably 33–35); $Q_0$ as measured in $TE_{011}$ mode of 7,000–23,000 (preferably 9,000–22,000, more preferably 10,000–21,000); $Q_0 \cdot f_0$ as measured in $TE_{01\delta}$ mode of 7,000–63,000 GHz (preferably 10,000–60,000 GHz, more preferably 20,000–60,000 GHz); and temperature coefficient of resonance frequency (τf) of −12 to 34 ppm/° C. (preferably −5 to 32 ppm/° C., more preferably −2 to 15 ppm/° C.).

When M is K and a is 2–8, the following characteristics can be attained: εr of 32–37 (preferably 32–36, more preferably 33–35); $Q_0$ as measured in $TE_{011}$ mode of 10,000–23,000 (preferably 11,000–22,000, more preferably 12,000–21,000); $Q_0 \cdot f_0$ as measured in $TE_{01\delta}$ mode of 20,000–63,000 GHz (preferably 30,000–60,000 GHz, more preferably 35,000–60,000 GHz); and temperature coefficient of resonance frequency (τf) of −12 to 34 ppm/° C. (preferably −5 to 32 ppm/° C., more preferably −2 to 15 ppm/° C).

When M is K, a is 2–8, and v is 0.2–0.8, the following characteristics can be attained: εr of 32–37 (preferably 32–36, more preferably 33–35); $Q_0$ as measured in $TE_{011}$ mode of 10,000–23,000 (preferably 11,000–22,000, more preferably 12,000–21,000); $Q_0 \cdot f_0$ as measured in $TE_{01\delta}$ mode of 20,000–63,000 GHz (preferably 30,000–60,000 GHz, more preferably 35,000–60,000 GHz); and temperature coefficient of resonance frequency (τf) of −12 to 34 ppm/° C. (preferably −5 to 32 ppm/° C., more preferably −2 to 15 ppm/° C.).

When the dielectric ceramic material further contains Mn or W, there can be attained a percent maintenance of Q value as expressed by percentage of Q value measured at 125° C. with respect to that measured at 25° C. of 70% or higher, preferably 72% or higher, more preferably 74% or higher, particularly preferably 75% or higher. The percent maintenance (%) is calculated on the basis of the following equation:

Percent maintenance (%)=(A/B)×100 where A represents $Q_0 \cdot f_0$ as measured at 125° C. in $TE_{01\delta}$ mode and B represents $Q_0 \cdot f_0$ as measured at 25° C. in $TE_{01\delta}$ mode. The aforementioned remarkably excellent dielectric characteristics can be provided by a dielectric ceramic material which has been produced through firing at 1,375–1,600° C., preferably 1,425–1,575° C.

The dielectric characteristics (εr, $Q_0$, and τf) were measured in the below-described $TE_{011}$ mode. The aforementioned $Q_0 \cdot f_0$ was measured in the below-described $TE_{01\delta}$ mode. The reason for employing $Q_0 \cdot f_0$ is that $Q_0 \cdot f_0$ cancels effect of inevitable variation (per measurement) of resonance frequency during measurement of dielectric characteristics. Through employment of $Q_0 \cdot f_0$, dielectric loss can be evaluated more accurately.

To provide further understanding of the present invention, the following examples are included, it being understood that these examples are only illustrative of the present invention and do not limit its scope in any way.

EXAMPLE 1

Production of Sintered Compacts

Barium carbonate powder, zirconium oxide powder, cobalt oxide (CoO) powder, niobium oxide ($Nb_2O_5$) powder, tantalum oxide ($Ta_2O_5$) powder, and potassium carbonate powder, all being commercial products and having a purity of 99.9% or higher, were weighed in predetermined amounts in accordance with compositional formulas corresponding to the experiments shown in Tables 1 and 2, where A to J appearing in the column of "Experiment No." represent types of compositions, and 1 to 6 denote the corresponding firing temperatures. Each resultant mixture was dry-mixed for 20–30 minutes by means of a mixer and subjected to primary pulverization by means of a vibration mill. Primary pulverization was performed for four hours by use of alumina balls serving as grinding balls.

The resultant powder was calcined in air at 1,100–1,300° C. for two hours, to thereby yield a calcined powder. The calcined powder was mixed with an appropriate amount of an organic binder and water, and the resultant mixture was subjected to secondary pulverization for 10–15 hours by means of a trommel pulverizer. The thus-pulverized product was freeze-dried and granulated, and granules having a particle size of 40 mesh to 200 mesh were separated from the granulated product by use of sieves. The thus-separated granules were molded by a press machine into compacts (diameter: 19 mm, height 11 mm). The compacts obtained from the above starting materials were debindered at 500° C. for four hours, and fired in air at a temperature shown in Table 1 or 2 for three hours, to thereby yield sintered compacts having compositions A to J.

Compacts having composition I (containing no M or Ta, and fired at 1,400° C. or 1,450° C. (I-1 and I-2)) failed to produce sintered dielectric ceramic material, since the firing temperatures were insufficient for attaining sintering. Compacts having composition D (containing M and Ta at a=20 and fired at 1,500° C. or higher (D-3)) melted during the course of firing, thereby failing to produce a sintered ceramic material, since the firing temperature was excessively high. Similarly, compacts having composition E (containing M and Ta in amounts falling outside the preferred amounts and fired at 1,400° C.) melted during the course of firing, thereby failing to produce sintered ceramic material.

Although compacts having composition A (containing M and Ta at a=2.5 and fired at 1,400° C. (A-1)) could not be sufficiently sintered, those fired at 1,450–1,600° C. (A-2 to A-2 to A-6) could produce dielectric ceramic materials. Compacts having composition B (containing M and Ta at a=5 and fired at 1,400° C. (B-1)) could produce dielectric ceramic materials.

The results indicate that incorporation of M and Ta lowers the firing temperature, and that the firing temperature can be lowered as the amounts of M and Ta increase within a range of a=2.5–20.

TABLE 1

| Experiment No. | Compositional formula $(100-a)[Ba_u[(Zn_vCo_{1-v})_wNb_x]O_{\delta 1}]$-$a[M_yTa_zO_{\delta 2}]$ | Firing temp. (° C.) |
|---|---|---|
| *A-1 | $97.5[Ba_{1.01}[(Zn_{0.5}Co_{0.5})_{0.324}Nb_{0.666}]O_{\delta 1}]$- | 1,400 |
| A-2 | $2.5[K_{1.5}TaO_{\delta 2}]$ | 1,450 |
| A-3 | | 1,500 |
| A-4 | | 1,525 |
| A-5 | | 1,550 |
| A-6 | | 1,600 |
| B-1 | $95[Ba_{1.01}[(Zn_{0.5}Co_{0.5})_{0.324}Nb_{0.666}]O_{\delta 1}]$- | 1,400 |
| B-2 | $5[K_{1.5}TaO_{\delta 2}]$ | 1,450 |
| B-3 | | 1,500 |
| B-5 | | 1,550 |
| C-1 | $90[Ba_{1.01}[(Zn_{0.5}Co_{0.5})_{0.324}Nb_{0.666}]O_{\delta 1}]$-$10[K_{1.5}TaO_{\delta 2}]$ | 1,400 |
| D-2 | $80[Ba_{1.01}[(Zn_{0.5}Co_{0.5})_{0.324}Nb_{0.666}]O_{\delta 1}]$- | 1,450 |
| *D-3 | $20[K_{1.5}TaO_{\delta 2}]$ | 1,500 |
| *E-1 | $50[Ba_{1.01}[(Zn_{0.5}Co_{0.5})_{0.324}Nb_{0.666}]O_{\delta 1}]$-$50[K_{1.5}TaO_{\delta 2}]$ | 1,400 |
| F-1 | $97.5[Ba_{1.01}[(Zn_{0.5}Co_{0.5})_{0.324}Nb_{0.666}]O_{\delta 1}]$- | 1,400 |
| F-2 | $2.5[Na_{1.5}TaO_{\delta 2}]$ | 1,450 |
| F-3 | | 1,500 |
| F-5 | | 1,550 |
| F-6 | | 1,600 |

TABLE 2

| Experiment No. | Compositional formula $(100-a)[Ba_u[(Zn_vCo_{1-v})_wNb_x]O_{\delta 1}]$-$a[M_yTa_zO_{\delta 2}]$ | Firing temp. (° C.) |
|---|---|---|
| G-1 | $97.5[Ba_{1.01}[(Zn_{0.5}Co_{0.5})_{0.324}Nb_{0.666}]O_{\delta 1}]$- | 1,400 |
| G-3 | $2.5[Li_{1.5}TaO_{\delta 2}]$ | 1,500 |
| G-5 | | 1,550 |
| G-6 | | 1,600 |
| H-1 | $97.5[Ba_{1.01}[(Zn_{0.5}Co_{0.5})_{0.324}Nb_{0.666}]O_{\delta 1}]$-$2.5[K_{1.5}TaO_{\delta 2}]$ | 1,525 |
| H-2 | $97.5[Ba_{1.01}[(Zn_{0.25}Co_{0.75})_{0.324}Nb_{0.666}]O_{\delta 1}]$-$2.5[K_{1.5}TaO_{\delta 2}]$ | |
| H-3 | $97.5[Ba_{1.01}[(Zn_{0.75}Co_{0.25})_{0.324}Nb_{0.666}]O_{\delta 1}]$-$2.5[K_{1.5}TaO_{\delta 2}]$ | |
| H-4 | $97.5[Ba_{1.01}[Zn_{0.324}Nb_{0.666}]O_{\delta 1}]$-$2.5[K_{1.5}TaO_{\delta 2}]$ | |
| *I-1 | $95[Ba_{1.01}[(Zn_{0.5}Co_{0.5})_{0.324}Nb_{0.666}]O_{\delta 2}]$ | 1,400 |
| *I-2 | | 1,450 |
| *I-3 | | 1,500 |
| *I-5 | | 1,550 |
| *I-6 | | 1,600 |
| *J-1 | $50[Ba_{1.01}[(Zn_{0.5}Co_{0.5})_{0.324}Nb_{0.666}]O_{\delta 1}]$-$50[K_{1.5}TaO_{\delta 2}]$ | 1,400 |

Figure 12:
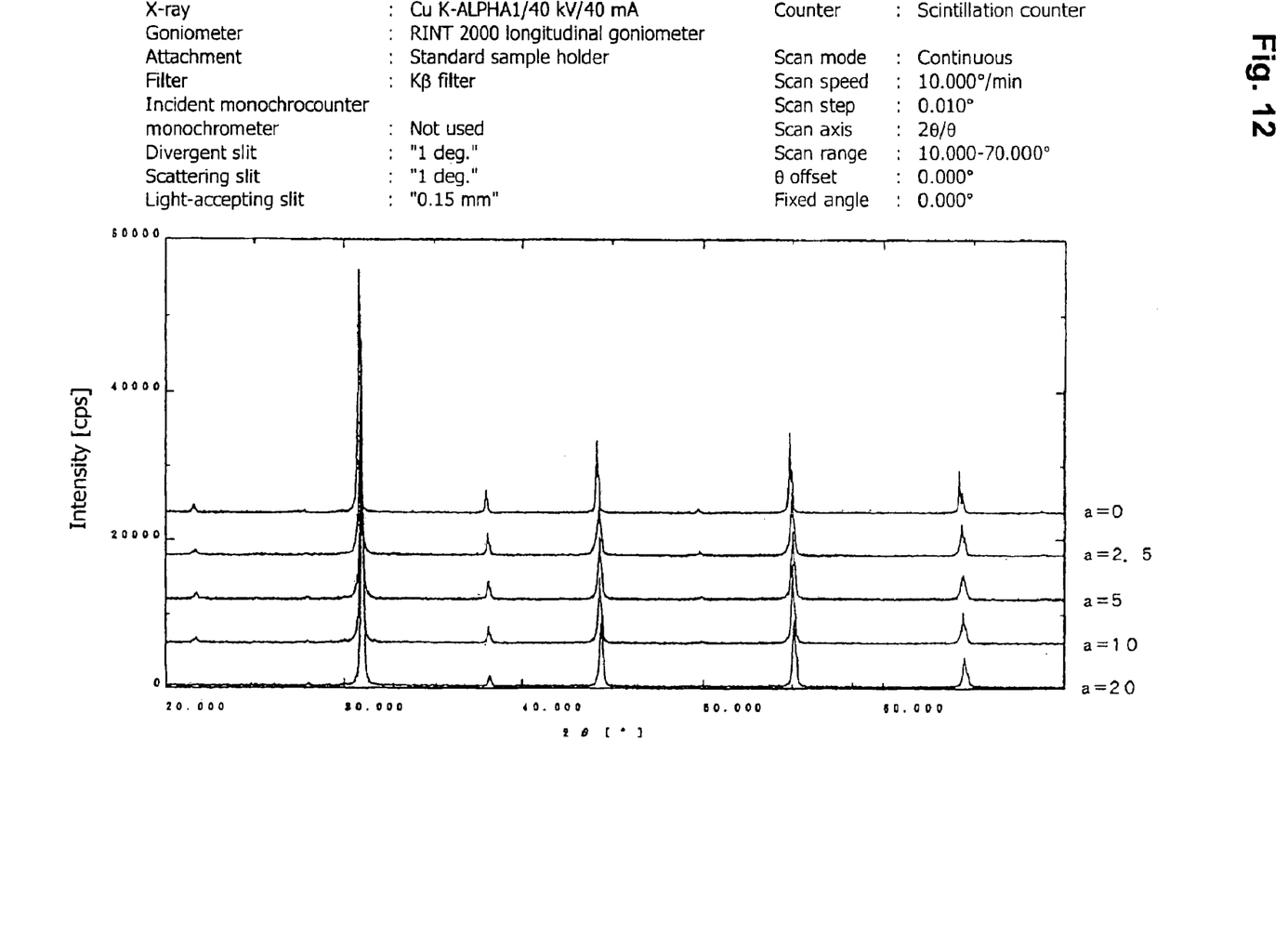
Figure 13:
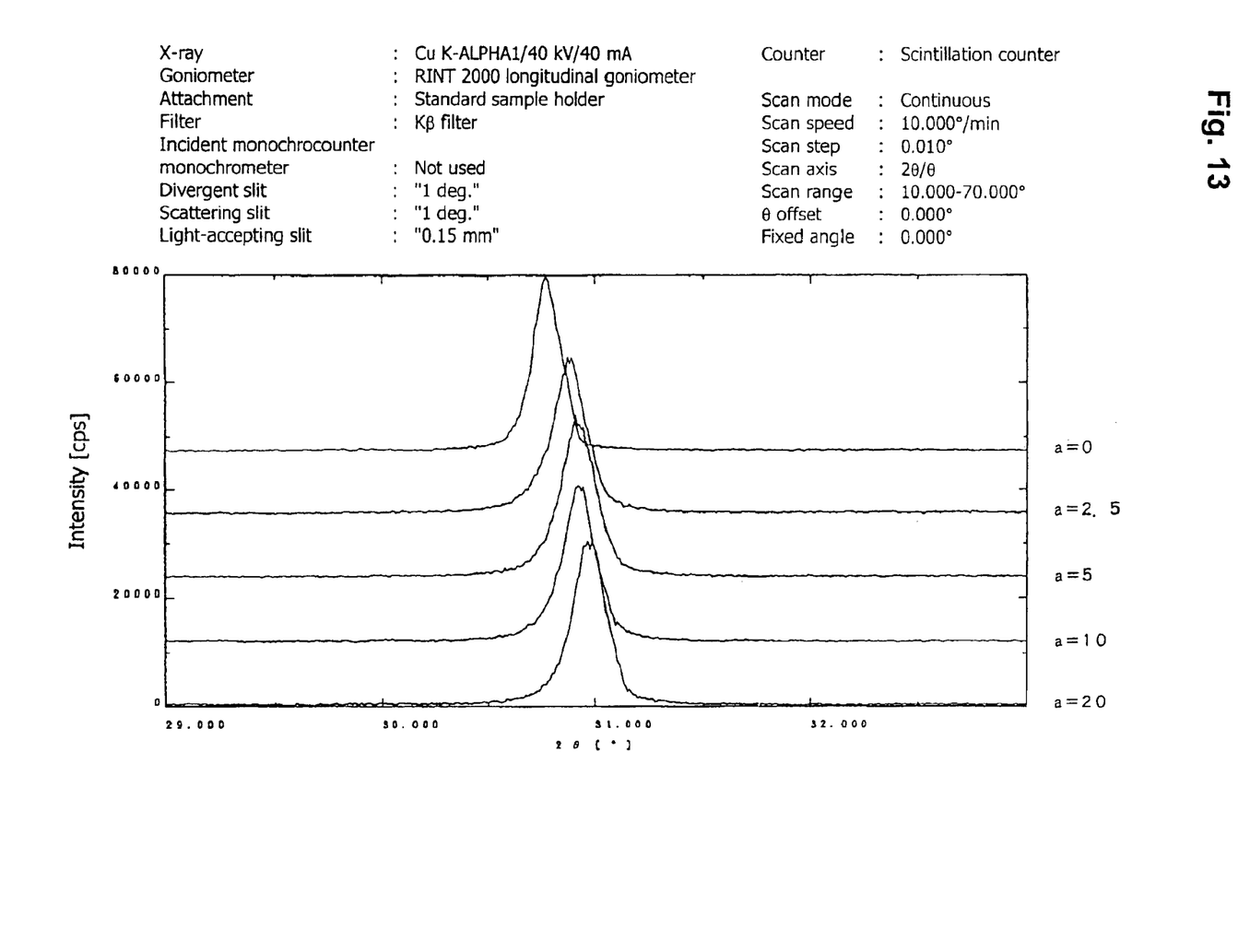
FIG. 13 is an enlarged portion of FIG. 12.

Each of dielectric ceramic materials produced in [1] (Experiment Nos. I-3 (a=0), A-4 (a=2.5), B-2 (a=5), C-1 (a=10), and D-2 (a=20)) was pulverized by use of a mortar, and the resultant powder was subjected to X-ray diffractometry (CuKα). FIGS. 12 and 13 are charts showing multiply recorded diffraction patterns. FIG. 12 is a chart showing a scanned angle range of 20–70°, and FIG. 13 is an enlarged portion of FIG. 12 showing diffraction peaks of a main crystal phase confirmed in the vicinity of 31°.

Figure 14:
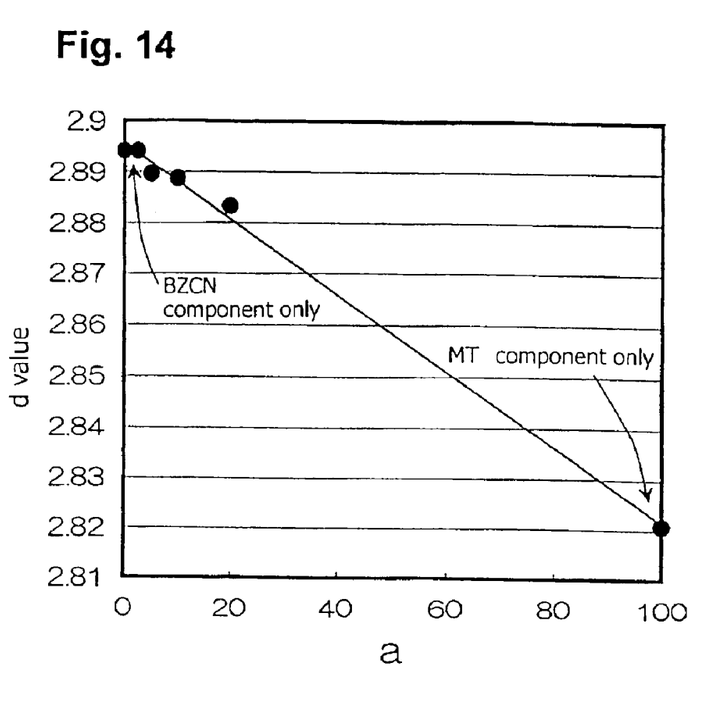
FIG. 14 is a graph showing correlation between a values and d values obtained through X-ray diffractometry of the dielectric ceramic materials according to the present invention.

FIG. 14 shows correlation between d values of the main crystal diffraction peak obtained through X-ray diffractometry and a values (a: variable in the above compositional formula of the dielectric ceramic material of the present invention).

FIGS. 12 and 13 show no diffraction peak at 31.69°, which would be attributed to a phase containing M and Ta when the phase is isolated from a main crystal phase of the BZCN component. In enlarged diffraction peak patterns shown in FIG. 13, diffraction peaks of dielectric ceramic materials containing the MT component shift to the higher angle side as increase in the MT component content, as compared with diffraction peaks of the main crystal phase formed solely of the BZCN component. FIG. 14 shows a proportional relationship between a values and d values. These results indicate that the BZCN component and the MT component form a solid solution in which the two components are mutually dissolved.

All sintered ceramic compacts that had been produced in Example 1 were polished, to thereby provide columnar ceramic pieces (diameter: 16 mm, height: 8 mm). Each of the polished ceramic pieces was evaluated in terms of εr, $Q_0$, and τf (temperature range: 25–80° C.) through a parallel-conductor-plates dielectric resonator method in $TE_{011}$ mode over 3–5 GHz. The results are shown in Tables 3 and 4. $Q_0$ and $f_0$ of the polished ceramic piece were also measured through a dielectric resonator method in $TE_{01\delta}$ mode over 3–4 GHz. Tables 3 and 4 also show values of the product $f_0 \cdot Q_0$

TABLE 3

| | | Dielectric characteristics | | | | |
|---|---|---|---|---|---|---|
| Experiment No. | Composition type | εr | $TE_{011}$ mode $Q_0$ | $TE_{01\delta}$ mode $f_0 \cdot Q_0$ (GHz) | τf (ppm/° C.) | Specific gravity |
| *A-1 | KTa-2.5 | | | Unsintered | | |
| A-2 | | 32.9 | 19,323 | 44,330 | 8.99 | 6.280 |
| A-3 | | 34.6 | 19,202 | 52,580 | 8.95 | 6.343 |
| A-4 | | 34.1 | 20,588 | 58,742 | 8.85 | 6.294 |
| A-5 | | 33.8 | 19,922 | 44,629 | 8.24 | 6.250 |
| A-6 | | 32.6 | 8,545.5 | 8,557 | 10.53 | 6.144 |
| B-1 | KTa-5.0 | 23.6 | 13,698 | 20,020 | 11.29 | 5.432 |
| B-2 | | 34.6 | 20,237 | 52,473 | 7.49 | 6.327 |
| B-3 | | 33.5 | 6,936 | 6,517 | 12.82 | 6.095 |
| B-5 | | 32.9 | 905 | 703 | 32.41 | 5.927 |
| C-1 | KTa-10 | 32.5 | 18,927 | 42,109 | 15.31 | 5.934 |

TABLE 3-continued

| Experiment No. | Composition type | $\epsilon r$ | TE$_{011}$ mode Q$_0$ | TE$_{01\delta}$ mode f$_0 \cdot$ Q$_0$ (GHz) | $\tau f$ (ppm/° C.) | Specific gravity |
|---|---|---|---|---|---|---|
| D-2 | KTa-20 | 38.4 | 10,265 | 17,168 | 35.55 | 6.372 |
| *D-3 | | | Dissolved | | | |
| *E-1 | | | Dissolved | | | |
| F-1 | NaTa-2.5 | 23.5 | 9,491 | 6,025 | 29.97 | 4.987 |
| F-2 | | 26.6 | 7,965 | 2,722 | 33.62 | 6.011 |
| F-3 | | 34.8 | 13,424 | 23,498 | 26.18 | 6.168 |
| F-5 | | 34.0 | 16,413 | 33,588 | 17.24 | 6.097 |
| F-6 | | 33.0 | 10,566 | 13,047 | 15.39 | 6.036 |

TABLE 4

| Experiment No. | Composition type | $\epsilon r$ | TE$_{011}$ mode Q$_0$ | TE$_{01\delta}$ mode f$_0 \cdot$ Q$_0$ (GHz) | $\tau f$ (ppm/° C.) | Specific gravity |
|---|---|---|---|---|---|---|
| G-1 | LiTa-2.5 | 21.2 | 9,527 | 4,737 | 14.44 | 4.482 |
| G-3 | | 34.1 | 8,428 | 11,227 | 8.53 | 6.324 |
| G-5 | | 32.2 | 2,934 | 2,494 | 8.32 | 6.012 |
| G-6 | | 31.6 | 2,142 | 1,843 | 13.15 | 5.830 |
| H-1 | Co-1 | 30.9 | 4,297 | 15,308 | −11.5 | 6.253 |
| H-2 | Co-0.75 | 32.5 | 10,290 | 32,084 | −1.1 | 6.287 |
| H-3 | Co-0.25 | 35.6 | 16,043 | 66,538 | 18.5 | 6.260 |
| H-4 | Co-0 | 36.9 | 13,027 | 65,391 | 31.6 | 6.173 |
| *I-1 | Non-KTa containing | | | Unsintered | | |
| *I-2 | | | | | | |
| *I-3 | | 29.0 | 5,120 | 6,035 | 20.89 | 5.515 |
| *I-5 | | 33.1 | 2,988 | 2,777 | 18.67 | 5.957 |
| *I-6 | | 33.3 | 6,314 | 6,419 | 19.02 | 5.972 |
| *J-1 | KTa-50 | | Dissolved (sintering impossible) | | | |

EXAMPLE 2

The procedure of Example 1 was repeated, except that manganese oxide (MnO$_2$) powder (purity 95%) and tungsten oxide (WO$_3$) powder (purity 99.8% or higher) were added to the raw material described in Example 1, to thereby yield sintered compact Nos. 1 to 21 having compositions shown in Table 5. Dielectric characteristics of these sintered compact Nos. 1 to 21 were evaluated in a manner similar to that of Example 1. The results are shown in Table 6. In Table 6, the symbol "*" denotes that the Mn content and the W content fall outside the preferred ranges.

TABLE 5

| Experiment No. | Compositional formula (100-a)[Ba$_u$[(Zn$_v$Co$_{1-v}$)$_w$Nb$_x$]O$_{\delta 1}$]- a[M$_y$Ta$_z$O$_{\delta 2}$] | Amount of Mn, W added (mass %) |
|---|---|---|
| 1 | 97.5[Ba$_{1.01}$[(Zn$_{0.5}$Co$_{0.5}$)$_{0.326}$Nb$_{0.666}$]O$_3$]- 2.5[K$_{1.5}$TaO$_3$] | Mn 0.05 |
| 2 | | Mn 0.10 |
| 3 | | Mn 0.25 |
| 4 | | Mn 0.8 |
| 5 | | Mn 1.3 |
| *6 | | Mn 0.01 |
| *7 | | Mn 3.5 |
| 8 | | W 0.05 |
| 9 | | W 0.10 |
| 10 | | W 0.80 |
| 11 | | W 1.5 |
| *12 | | W 0.01 |

TABLE 5-continued

| Experiment No. | Compositional formula (100-a)[Ba$_u$[(Zn$_v$Co$_{1-v}$)$_w$Nb$_x$]O$_{\delta 1}$]- a[M$_y$Ta$_z$O$_{\delta 2}$] | Amount of Mn, W added (mass %) |
|---|---|---|
| *13 | | W 5.0 |
| *14 | | None |
| 15 | 95[Ba$_{1.01}$[(Zn$_{0.5}$Co$_{0.5}$)$_{0.324}$Nb$_{0.666}$]O$_3$]- 5[K$_{1.5}$TaO$_3$] | Mn 0.05 |
| 16 | 97.5[Ba$_{1.01}$[(Zn$_{0.5}$Co$_{0.5}$)$_{0.324}$Nb$_{0.666}$]O$_3$]- 2.5[Na$_{1.01}$TaO$_3$] | Mn 0.05 |
| *17 | | None |
| 18 | 97.5[Ba$_{1.01}$[Co$_{0.324}$Nb$_{0.666}$]O$_3$]- 2.5[K$_{1.5}$TaO$_3$] | Mn 0.10 |
| *19 | | None |
| 20 | 97.5[Ba$_{1.01}$[Zn$_{0.324}$Nb$_{0.666}$]O$_3$]- 2.5[K$_{1.5}$TaO$_3$] | Mn 0.15 |
| *21 | | Mn 0.01 |

TABLE 6

| Experiment No. | $\epsilon r$ | TE$_{011}$ mode f$_0 \cdot$ Q$_0$ (GHz) | TE$_{01\delta}$ mode f$_0 \cdot$ Q$_0$ (GHz) 25° C. | 125° C. | Percent maintenance (%) | $\tau f$ (ppm/° C.) |
|---|---|---|---|---|---|---|
| 1 | 34.1 | 20,590 | 59,240 | 43,720 | 73.8 | 8.93 |
| 2 | 34.1 | 21,000 | 60,584 | 46,165 | 76.2 | 9.24 |
| 3 | 34.4 | 20,890 | 56,221 | 42,390 | 75.4 | 8.72 |
| 4 | 34.5 | 19,620 | 52,104 | 38,870 | 74.6 | 9.11 |
| 5 | 35.2 | 16,600 | 48,774 | 38,239 | 78.4 | 8.72 |
| *6 | 34.1 | 20,600 | 57,202 | 37,410 | 65.4 | 8.61 |
| *7 | 34.8 | 10,500 | 18,624 | 14,545 | 78.1 | 12.11 |
| 8 | 34.1 | 20,420 | 57,733 | 41,799 | 72.4 | 8.64 |
| 9 | 34.2 | 20,930 | 61,425 | 47,973 | 78.1 | 8.84 |
| 10 | 34.3 | 21,150 | 58,611 | 45,541 | 77.7 | 9.12 |
| 11 | 35.6 | 18,600 | 32,614 | 25,896 | 79.4 | 8.72 |
| *12 | 34.1 | 20,400 | 57,912 | 37,179 | 64.2 | 8.84 |
| *13 | 36.0 | 9,640 | 14,272 | 11,303 | 79.2 | 11.21 |
| *14 | 34.1 | 20,588 | 58,742 | 38,299 | 65.2 | 8.85 |
| 15 | 32.5 | 19,200 | 43,105 | 31,984 | 74.2 | 15.74 |
| 16 | 34.1 | 17,200 | 33,704 | 25,312 | 75.1 | 16.41 |
| *17 | 34.0 | 16,413 | 33,588 | 21,228 | 63.2 | 17.24 |
| 18 | 31.6 | 5,240 | 9,440 | 7,288 | 77.2 | −8.41 |
| *19 | 30.9 | 4,297 | 8,962 | 6,130 | 68.4 | −11.5 |
| 20 | 36.7 | 14,620 | 32,200 | 25,245 | 78.4 | 30.1 |
| *21 | 36.9 | 13,027 | 17,240 | 11,068 | 64.2 | 31.6 |

Effects of incorporation of M and Ta can be confirmed from FIGS. 1 to 4, which correlation between a (i.e., (M plus Ta) content) and $\epsilon r$, the relationship between a and Q$_0$, correlation between a and Q$_0 \cdot$f$_0$, and correlation between a and $\tau f$, respectively. In connection with FIGS. 1 to 4, among dielectric ceramic material samples having the same composition produced at different firing temperatures, a sample exhibiting most well-balanced dielectric characteristics was selected and the numerical data thereof are plotted.

It will be apparent to one skilled in the art from FIGS. 1 to 4, as compared with dielectric ceramic materials containing no M or Ta, that the dielectric ceramic materials of the present composition containing M and Ta exhibit enhanced $\epsilon r$, Q$_0$, Q$_0 \cdot$f$_0$, and $\tau f$, regardless of the species of M. In particular, Q$_0$, Q$_0 \cdot$f$_0$, and $\tau f$ can be remarkably enhanced through incorporation of small amounts (a≦2.5) of M and Ta. Q$_0$ and Q$_0 \cdot$f$_0$ exhibit their maximum values at a=2.5. Q$_0$ is as high as 10,000 or more at a=1–20, and Q$_0 \cdot$f$_0$, is as high as 40,000 GHz or more at a=1–11. $\tau f$ exhibits its minimum at a=5 and is as low as 8–15[ppm/° C. ] at a=2–10.

When M is K or Na, the effect of enhancing Q$_0$ and Q$_0 \cdot$f$_0$ is remarkably great. This effect is particularly enhanced when M is K. Both K and Li exert a great effect of enhancing $\tau f$ (i.e., lowering the absolute value of $\tau f$).

Effects of the type of M on correlation between firing temperature and dielectric characteristics In order to confirm effects of the type of M on correlation between firing temperature and dielectric characteristics, dielectric ceramic material samples of compositions A, F, and G were investigated in terms of correlation between firing temperature and $\epsilon r$, correlation between firing temperature and $Q_0$, correlation between firing temperature and $Q_0 \cdot f_0$, and correlation between firing temperature and $\tau f$, and the results are shown in FIGS. 5 to 8, respectively.

Figure 5:
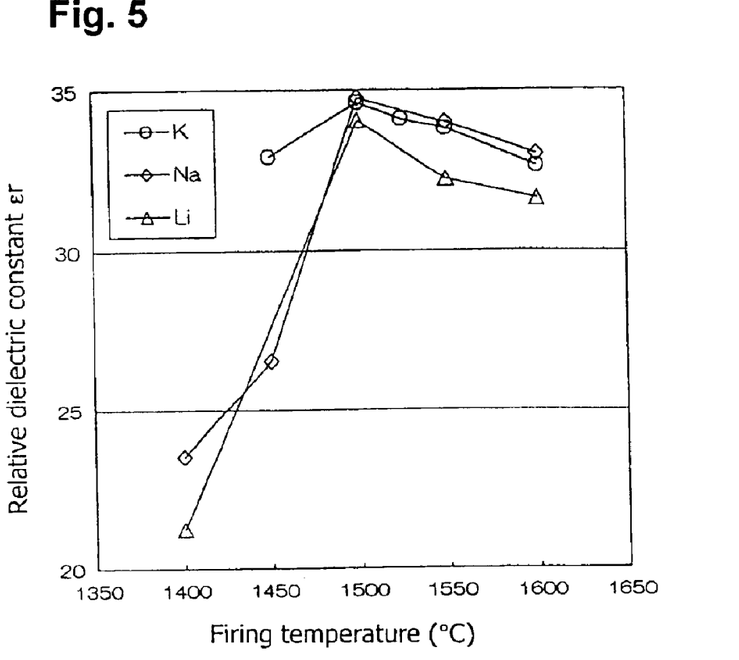
FIG. 5 is a graph showing correlation between firing temperature and $\epsilon r$.
Figure 6:
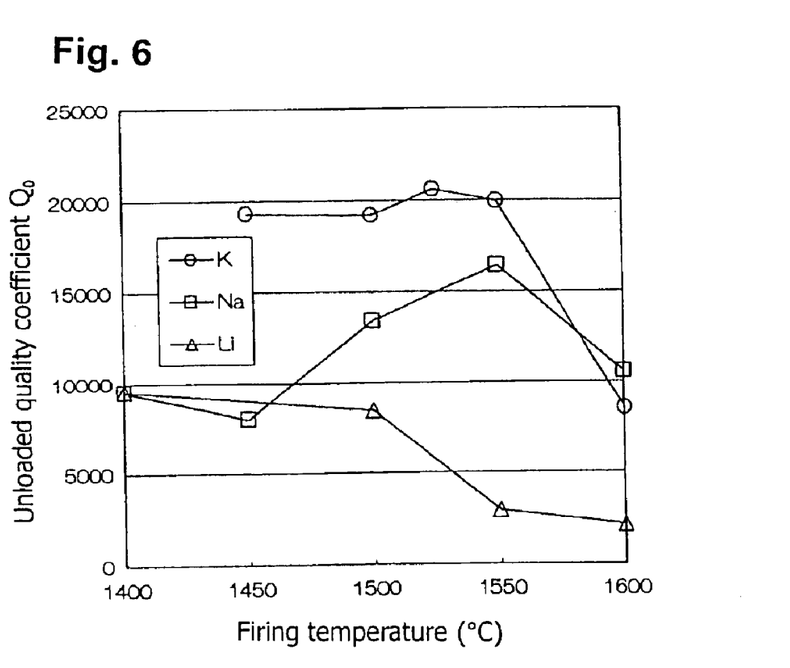
FIG. 6 is a graph showing relationship between firing temperature and $Q_0$.
Figure 7:
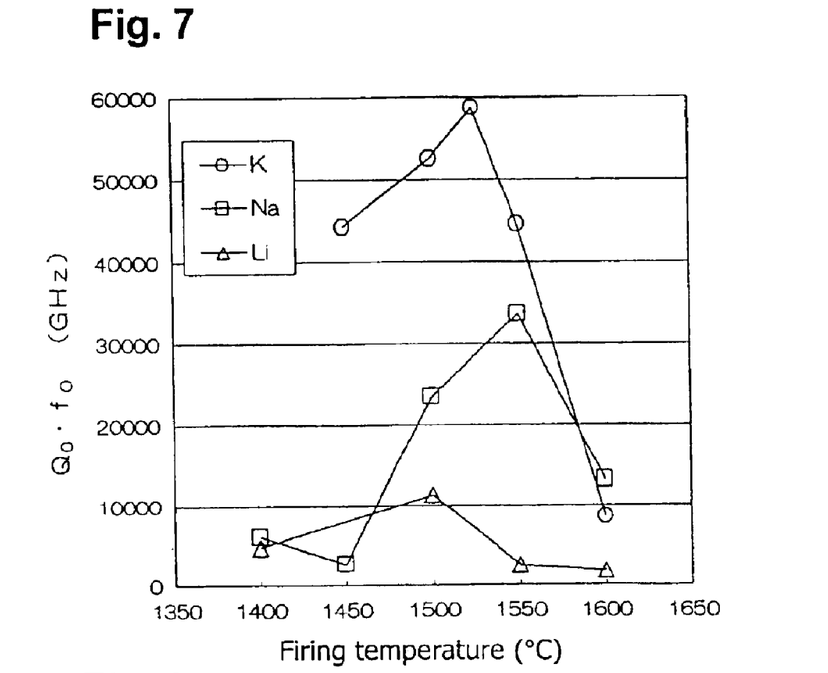
FIG. 7 is a graph showing correlation between firing temperature and $Q_0 \cdot f_0$.
Figure 8:
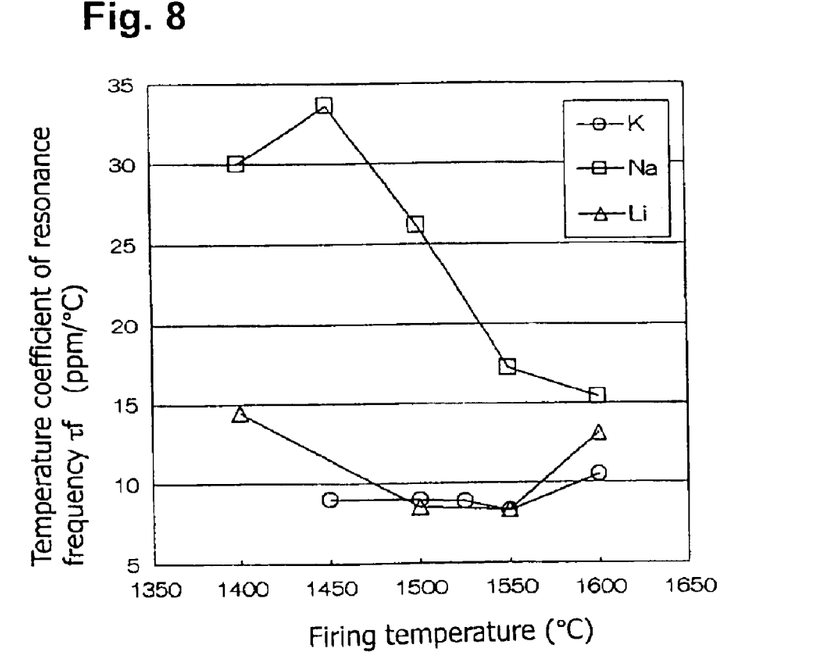
FIG. 8 is a graph showing correlation between firing temperature and $\tau f$.

FIGS. 5 and 6 show that K is particularly preferred as M, since well-balanced, excellent dielectric characteristics can be attained when the ceramic materials are produced at low firing temperature. Specifically, for a firing temperature of 1,450° C., when M is K, $\epsilon r$, $Q_0$, and $Q_0 \cdot f_0$ are remarkably increased as compared with the case where M is Na or Li, and the absolute value of $\epsilon f$ is remarkably lowered.

Figure 9:
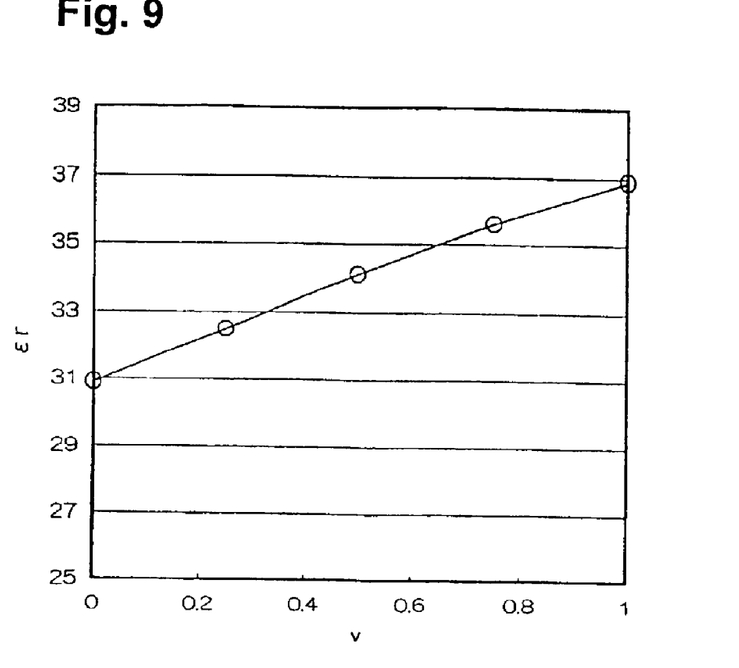
FIG. 9 is a graph showing correlation between v and $\epsilon r$.
Figure 10:
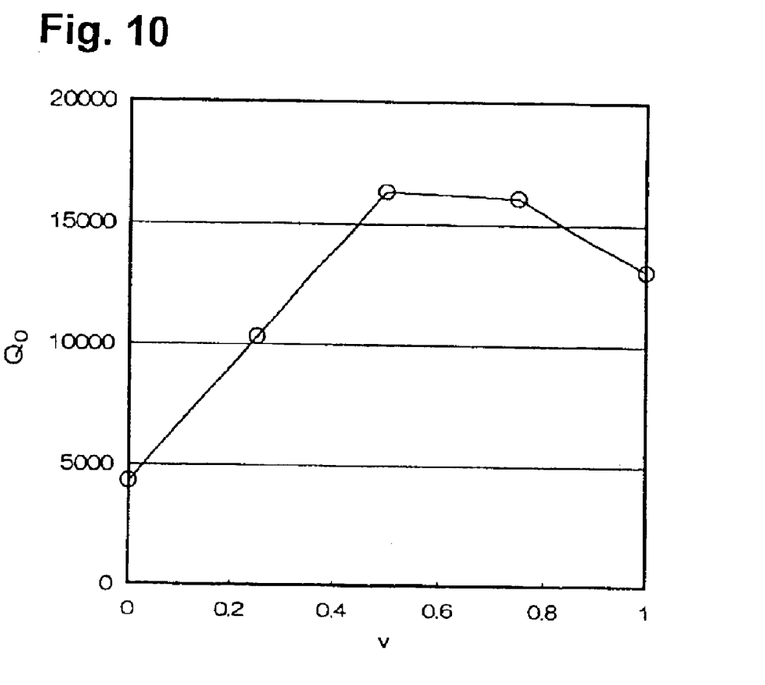
FIG. 10 is a graph showing correlation between v and $Q_0$.
Figure 11:
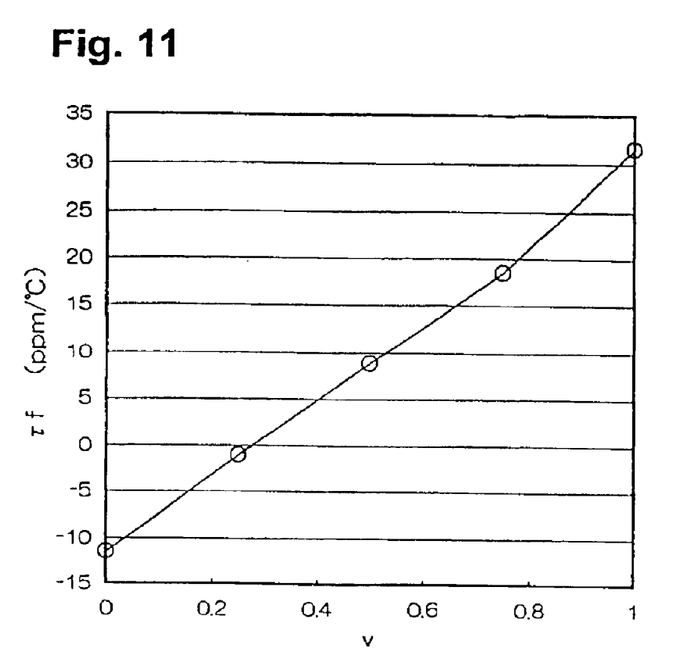
FIG. 11 is a graph showing correlation between v and $\tau f$.

In order to confirm effects of incorporation of Co and Zn, dielectric ceramic material samples of composition G were investigated in terms of correlation between v (Co (or Zn) content) and $\epsilon r$, correlation between v and $Q_0$, and correlation between v and $\tau f$, and the results are shown in FIGS. 9 to 11, respectively.

As shown in FIGS. 9 to 11, $\epsilon r$ and $\tau f$ increase approximately in proportion to increase in v (i.e., increase in Zn content). $Q_0$ exhibits unexpected behavior; i.e., increases steeply at V=approximately 0.5, remains approximately constant around v=0.5–0.8, and gradually decreases at V≧0.8. Accordingly, in order to attain well-balanced dielectric characteristics, V is preferably controlled to 0.8 or less, particularly preferably V=0.4–0.8, in that $Q_0$ is as high as at least 10,000.

Table 6 shows that sample Nos. 1–5 containing Mn in an amount of 0.02–3 mass % as reduced to $MnO_2$ exhibit $Q_0 \cdot f_0$ at 25° C. of 48,000 GHz or higher, $Q_0 \cdot f_0$ at 125° C. of 38,000 GHz or higher, and percent maintenance as high as 74% or more. Similarly, sample Nos. 8–11 containing W in an amount of 0.02–4.5 mass % as reduced to $WO_3$ show $Q_0 \cdot f_0$ at 25° C. of 32,000 GHz or higher, $Q_0 \cdot f_0$ at 125° C. of 25,000 GHz or higher, and percent maintenance as high as 72% or more. In addition, sample Nos. 1 to 5 and Nos. 8–11 exhibit $\tau f$ as small as 9.5 or less. These results indicate that dielectric ceramic materials containing Mn in an amount of 0.02–3 mass % as reduced to $MnO_2$ or those containing W in an amount of 0.02–4.5 mass % as reduced to $WO_3$ exhibit more excellent dielectric characteristics and can attain excellent percent maintenance of Q value measured at high temperature with respect to that measured at room temperature.

Sample Nos. 6, 12, and 14, all having the same composition of the predominant component and containing Mn in an amount of 0.01 mass % as reduced to $MnO_2$, W in an amount of 0.01 mass % as reduced to $WO_3$, and no Mn or W, respectively, exhibit $Q_0 \cdot f_0$ at 25° C. of 57,000 GHz or higher, and $Q_0 \cdot f_0$ at 125° C. of 37,000 GHz or higher, but exhibit a low percent maintenance of approximately 64–65%. Sample No. 7 containing Mn in an amount of 3.5 mass % as reduced to $MnO_2$ and sample No.13 containing W in an amount of 5.0 mass % as reduced to $WO_3$, exhibit high percent maintenance of 78.1% and 79.2%, respectively, but exhibit considerably low $Q_0 \cdot f_0$ values; i.e., $Q_0 \cdot f_0$ at 25° C. of 19,000 GHz or less, $Q_0 \cdot f_0$ at 125° C. of 15,000 GHz or less, and $\tau f$ of 11 or greater.

The above tendency is also recognized in pairs of samples; specifically, Nos. 16 and 17, Nos. 18 and 19, and Nos. 20 and 21, each pair of samples having the same composition of the predominant component. Namely, dielectric ceramic material Nos. 16, 18, and 20 containing Mn in an amount of at least 0.02 mass % (as reduced to oxide) exhibit high percent maintenance, whereas dielectric ceramic material Nos. 17, 19, and 21 having an Mn content less than 0.02 mass % exhibit a decreased $Q_0 \cdot f_0$ and a decreased percent maintenance.

As described hereinabove, in order to fully attain the effects of incorporation of M and Ta simultaneously with those of Co and Zn, v preferably falls within a range of $0.4 \leq v \leq 0.8$, and a preferably falls within a range of $1 \leq a \leq 11$. More preferably, v falls within a range of $0.4 \leq v \leq 0.7$, and a falls within a range of $2 \leq a \leq 8$. Particularly preferably, v falls within a range of $0.4 \leq v \leq 0.6$, and a falls within a range of $2 \leq a \leq 6$.

When Mn or W is incorporated, the Mn content is preferably 0.02–3 mass % as reduced to $MnO_2$, and the W content is preferably 0.02–4.5 mass % as reduced to $WO_3$.

The present invention is not limited to the aforementioned specific examples, and various modifications may be employed within the scope of the present invention, in accordance with purposes and use. Specifically, other than Ba, Zn, Co, Nb, Ta, K, Na, Li, and O, any elements may be incorporated in certain amounts so long as various dielectric characteristics of the ceramic materials are not impaired in accordance with the disclosure provided herein. No particular limitation is imposed on the additional elements, and examples include Mn, Mg, Fe, W, and B.

According to the present invention, there can be provided novel dielectric ceramic materials, in particular, dielectric ceramic materials exhibiting a small dielectric loss and a small absolute value of temperature coefficient of resonance frequency. In addition, such dielectric ceramic materials can be produced through firing at low temperature. According to the present invention, high percent maintenance of Q value measured at high temperature with respect to that measured at room temperature can be attained.

Although the invention has been described above in relation to preferred embodiments thereof, it will be understood by those skilled in the art that variations and modifications can be effected in these preferred embodiments without departing from the scope and spirit of the invention.

What is claimed:

1. A dielectric ceramic material comprising:
   Ba, Nb, and Ta;
   at least Co; and
   at least one species selected from the group consisting of K, Na, and Li,
   said ceramic material being represented by the compositional formula:

(100-a)[Ba$_u${(Zn$_v$Co$_{1-v}$)$_w$Nb$_x$}O$_{\delta 3}$]-a[M$_y$Ta$_z$O$_{\delta 3}$], where M represents at least one species selected from the group consisting of K, Na, and Li, and the following relations are satisfied simultaneously:
   $0.5 \leq a \leq 25$;  $0.98 \leq u \leq 1.03$;  $0.4 \leq v \leq 0.8$
   $0.274 \leq w \leq 0.374$;  $0.646 \leq x \leq 0.696$;  $0.5 \leq y \leq 2.5$; and
   $0.8 \leq z \leq 1.2$.

2. A dielectric ceramic material of claim 1, wherein M is K.

3. A dielectric ceramic material of claim 1, wherein y and z satisfy the following relations: $1.0 \leq y \leq 2.0$ and $0.9 \leq z \leq 1.1$.

4. A dielectric ceramic material of claim 1, wherein a satisfies the following relation: $1 \leq a \leq 10$.

5. A dielectric ceramic material represented by the compositional formula:

(100-a)[Ba$_u${(Zn$_v$Co$_{1-v}$)$_w$Nb$_x$}O$_3$]-a[M$_y$Ta$_z$O$_3$], wherein the ceramic material includes Co and wherein M represents at least one species selected from the group consisting of K, Na, and Li, said ceramic material being produced by mixing raw material powders such that proportions by mol of component metals simultaneously satisfy the relations: $0.5 \leq a \leq 25$; $0.98 \leq u \leq 1.03$; $0.4 \leq v \leq 0.8$; $0.274 \leq w \leq 0.374$; $0.646 \leq x \leq 0.696$; $0.5 \leq y \leq 2.5$; and $0.8 \leq z \leq 1.2$; molding the resultant mixture powder, to thereby yield a compact; and firing the compact to produce a ceramic material having dielectric constant $\epsilon r$ between 30 and 37.

6. The dielectric ceramic material of claim 5, wherein M is K.

7. The dielectric ceramic material of claim 5, wherein y and z satisfy the following relations: $1.0 \leq y \leq 2.0$ and $0.9 \leq z \leq 1.1$.

8. The dielectric ceramic material of claim 5, wherein a satisfies the following relation: $1 \leq a \leq 10$.

9. A dielectric ceramic material comprising:
Ba, Nb, and Ta;
at least Co;
at least one species selected from the group consisting of K, Na, and Li; and
Mn or W,
wherein Mn and W are contained in amounts of 0.02–3 mass % as reduced to $MnO_2$ and 0.02–4.5 mass % as reduced to $WO_3$, respectively, on the basis of 100 parts by mass of the following composition $(100-a)[Ba_u\{(Zn_vCo_{1-v})_wNb_x\}O_3]-a[M_yTa_zO_3]$, wherein M represents at least one species selected from the group consisting of K, Na, and Li, and the following relations are satisfied simultaneously: $0.5 \leq a \leq 25$; $0.98 \leq u \leq 1.03$; $0.4 \leq v \leq 0.8$; $0.274 \leq w \leq 0.374$; $0.646 \leq x \leq 0.696$; $0.5 \leq y \leq 2.5$; and $0.8 \leq z \leq 1.2$, said dielectric ceramic material having a dielectric constant $\epsilon r$ between 30 and 37.

10. The dielectric ceramic material of claim 9, wherein said ceramic material has a percent maintenance of unloaded quality coefficient as expressed by percentage of unloaded quality coefficient measured at 125° C. with respect to that measured at 25° C. of at least 70%.

11. A method for manufacturing a dielectric ceramic material, said method comprising the steps of:

mixing raw material powders which will comprise the dielectric ceramic material represented by the compositional formula: $(100-a)[Ba_u\{(Zn_vCo_{1-v})_wNb_x\}O_3]-a[M_yTa_zO_3]$, wherein the material includes Co and wherein M represents at least one species selected from the group consisting of K, Na, and Li, such that proportions by mol of component metals simultaneously satisfy the relations: $0.5 \leq a \leq 25$; $0.98 \leq u \leq 1.03$; $0.4 \leq v \leq 0.8$; $0.274 \leq w \leq 0.374$; $0.646 \leq x \leq 0.696$; $0.5 \leq y \leq 2.5$; and $0.8 \leq z \leq 1.2$;

molding the resultant mixture powder, to thereby yield a compact; and firing the compact to thus produce a dielectric ceramic material having dielectric constant $\epsilon r$ between 30 and 37.

12. A method of claim 11, wherein M is K.

13. The method of 11, wherein y and z satisfy the relations: $1.0 \leq y \leq 2.0$ and $0.9 \leq z \leq 1.1$.

14. The method of claim 11, wherein a satisfies the relation: $1 \leq a \leq 10$.

15. The dielectric material produced by the method of claim 10.

16. The dielectric ceramic material of claim 15, wherein M is K.

17. The dielectric ceramic material of 15, wherein y and z satisfy the relations: $1.0 \leq y \leq 2.0$ and $0.9 \leq z \leq 1.1$.

18. The dielectric ceramic material of 15, wherein a satisfies the relation: $1 \leq a \leq 10$.

* * * * *